United States Patent
Kuboyama

(10) Patent No.: US 10,044,904 B2
(45) Date of Patent: Aug. 7, 2018

(54) APPARATUS, IMAGE READING METHOD, AND STORAGE MEDIUM FOR READING AN IMAGE OF A TARGET OBJECT

(71) Applicant: CANON KABUSHIKI KAISHA, Tokyo (JP)

(72) Inventor: Hideo Kuboyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/213,837

(22) Filed: Jul. 19, 2016

(65) Prior Publication Data
US 2017/0041500 A1   Feb. 9, 2017

(30) Foreign Application Priority Data

Aug. 4, 2015 (JP) .................................. 2015-154205

(51) Int. Cl.
*H04N 1/387* (2006.01)
*H04N 1/00* (2006.01)
*H04N 1/10* (2006.01)

(52) U.S. Cl.
CPC ....... *H04N 1/3876* (2013.01); *H04N 1/00013* (2013.01); *H04N 1/00034* (2013.01); *H04N 1/00037* (2013.01); *H04N 1/00058* (2013.01); *H04N 1/00519* (2013.01); *H04N 1/10* (2013.01); *H04N 2201/0081* (2013.01)

(58) Field of Classification Search
USPC .......................... 382/170–181, 190, 275, 318
See application file for complete search history.

(56) References Cited

U.S. PATENT DOCUMENTS

| | | | | |
|---|---|---|---|---|
| 2005/0128551 A1* | 6/2005 | Yang | .................... | G02B 6/0016 359/212.2 |
| 2008/0231892 A1* | 9/2008 | Sugahara | ........... | H04N 1/00355 358/1.15 |
| 2008/0317306 A1* | 12/2008 | Hamilton | ........... | G06K 9/00026 382/128 |
| 2010/0194908 A1* | 8/2010 | Karasawa | ............... | G06F 3/017 348/222.1 |

FOREIGN PATENT DOCUMENTS

| | | |
|---|---|---|
| JP | H10-136194 A | 5/1998 |
| JP | 2013-247531 A | 12/2013 |

* cited by examiner

*Primary Examiner* — Marcellus Augustin
(74) *Attorney, Agent, or Firm* — Carter, Deluca, Farrell & Schmidt, LLP

(57) ABSTRACT

Provided is an apparatus, including: an image input unit configured to receive input of an image on which a target object placed on an operation plane imaged as a subject; an operation detecting unit configured to detect movement of a predetermined operation object in a state of being in contact with the target object using the image; a partial-image acquiring unit configured to acquire a partial image corresponding to a portion of the target object from the image in accordance with a position of the predetermined operation object being moved in a case where the movement of the predetermined operation object is detected by the operation detecting unit; and a generating unit configured to generate an image representing the target object using a plurality of the partial images acquired by the partial-image acquiring unit.

16 Claims, 15 Drawing Sheets

301  502

503

504  505

503

1001

1101

301   502

APPARATUS, IMAGE READING METHOD, AND STORAGE MEDIUM FOR READING AN IMAGE OF A TARGET OBJECT

BACKGROUND OF THE INVENTION

Field of the Invention

The present invention relates to an apparatus configured to appropriately reading an image of a target object such as a paper document or a book, an image reading method, and a storage medium.

Description of the Related Art

A technology of digitalizing a target object such as a paper document or a book into image data or text data has been widespread. For the digitalization, a scanner configured to sandwich the target object between an original table and a pressure plate so as to read the target object, a document camera configured to readily acquire an image of the target object, and the like are used. The document camera includes a table on which the target object is to be placed and an imaging unit such as a camera, configured to image the target object on the table from above. When the target object placed on the table is a document or a book with distortion, e.g., a curl, it is important to image the target object while suppressing the distortion as much as possible. In Japanese Patent Application Laid-Open No. Hei 10-136194 and Japanese Patent Application Laid-Open No. 2013-247531, there is disclosed an apparatus configured to image an original document while a user holds down the document with hands or the fingers so as to suppress the distortion, erase an image of the hands or the fingers from an imaged image, and digitalize the imaged image.

When the target object is imaged while being held down with the hands or the fingers, the hands generally hold ends of the target object so as to prevent the hands or the fingers from being present in an imaged area as much as possible. Therefore, there is a possibility that distortion in a portion other than in a peripheral portion that is held down with the hands or the fingers cannot be sufficiently suppressed. For example, when a fold remains in the vicinity of the center of the document, the distortion in the vicinity of the fold cannot be sufficiently suppressed only by holding down both sides of the document. In this case, a character or the like on the read document is distorted. Therefore, when the imaged image is subjected to handwritten character recognition, image recognition, or form recognition, accuracy of recognition is lowered due to the distortion of the image. Therefore, the target object is required to be imaged while being held down at each distorted portion of the target object to suppress the distortion.

SUMMARY OF THE INVENTION

According to an aspect of the present disclosure, an apparatus comprises an image input unit configured to receive input of an image on which a target object placed on an operation plane imaged as a subject; an operation detecting unit configured to detect movement of a predetermined operation object in a state of being in contact with the target object using the image; a partial-image acquiring unit configured to acquire a partial image corresponding to a portion of the target object from the image in accordance with a position of the predetermined operation object being moved in a case where the movement of the predetermined operation object is detected by the operation detecting unit; and a generating unit configured to generate an image representing the target object using a plurality of the partial images acquired by the partial-image acquiring unit.

Further features of the present invention will become apparent from the following description of exemplary embodiments (with reference to the attached drawings).

DESCRIPTION OF THE EMBODIMENTS

Now, embodiments of the present invention are described in detail with reference to the drawings. Note that, components described in this embodiment are merely exemplary components, and are not intended to limit the scope of the present invention to those components.

[First Embodiment]

(Configuration)

Figure 1:
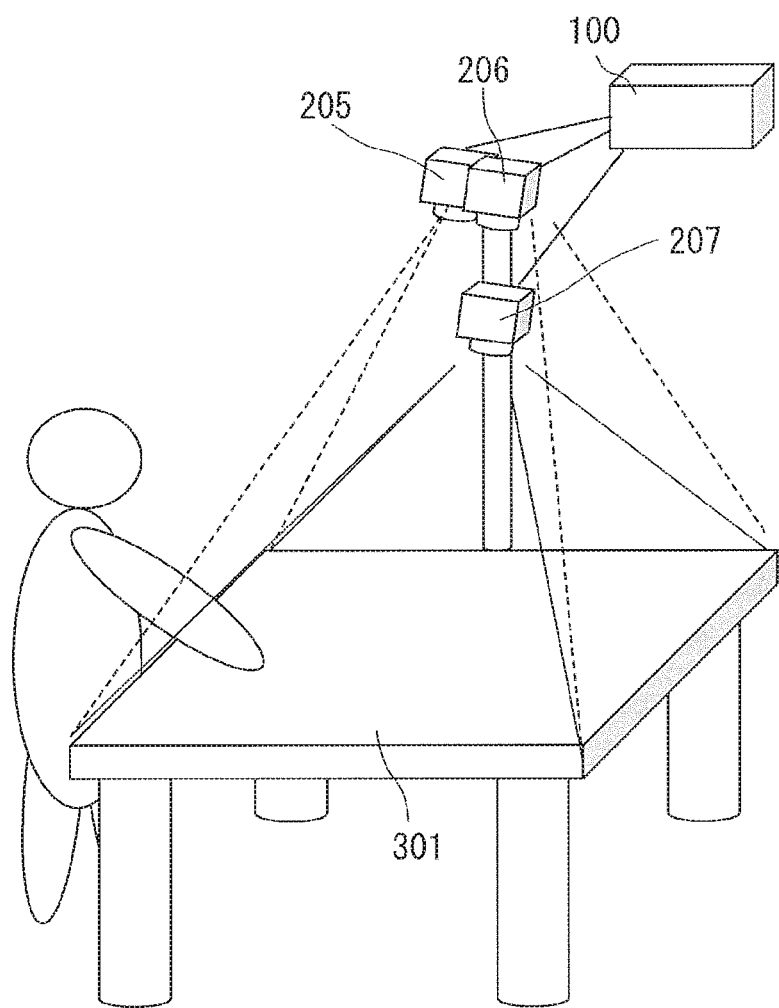
FIG. 1 is a configuration diagram of an image reading system.

FIG. 1 is a configuration diagram of an image reading system including an image processing apparatus according to a first embodiment of the present invention. The image reading system includes an image processing apparatus 100, an operation table 301 having an operation plane on which a target object is to be placed, a camera 205, a range-image sensor 206, and a projector 207. The image processing apparatus 100 is an information processing apparatus, e.g., a personal computer, which is connected to the camera 205, the range-image sensor 206, and the projector 207, to function as a controller for each of the apparatus.

The camera 205 is an imaging apparatus provided so as to image a visible image of the operation plane of the operation table 301. The camera 205 is configured to image the target object such as a paper document or a book placed on the operation plane of the operation table 301. The camera 205 transmits image data acquired by imaging to the image processing apparatus 100.

The range-image sensor 206 is provided so as to acquire a range image of the operation plane of the operation table

301. The range-image sensor 206 transmits range-image data representing the acquired range image to the image processing apparatus 100. The range image is an image used for detection of an object moving on the operation plane and indicates a distance from the range-image sensor 206 to each of pixels within an angle of view covering the entire operation plane. The range-image sensor 206 is realized by a sensor configured to radiate light, e.g., infrared light, so as to measure the distance based on reflection time of the light, a sensor configured to radiate pattern light so as to measure the distance based on a pattern shape of the pattern light, or a stereo camera. Further, the range-image sensor 206 may have functions of the camera 205. A motion sensor can also be used as a movement detecting apparatus in place of the range-image sensor 206 as long as the movement of the object on the operation plane can be detected.

The projector 207 is a display apparatus configured to project the image onto the operation plane of the operation table 301 through control performed by the image processing apparatus 100. The image showing a user interface (UI) component and information is displayed on the operation plane. The camera 205, the range-image sensor 206, and the projector 207 can be used as user interfaces of the image processing apparatus 100. For example, when the user operates the UI component projected onto the operation plane through a touching operation, a touched position and a touching gesture are detected based on an image picked up by the range-image sensor 206 or the camera 205. The result of detection is transmitted to the image processing apparatus 100. The image processing apparatus 100 determines the touching operation performed by the user based on the result of detection performed by the range-image sensor 206 or the camera 205 so as to be able to perform processing in accordance with the touching operation. The operation plane may be formed of a display so that the image is displayed on the operation plane without using the projector 207.

Figure 2:
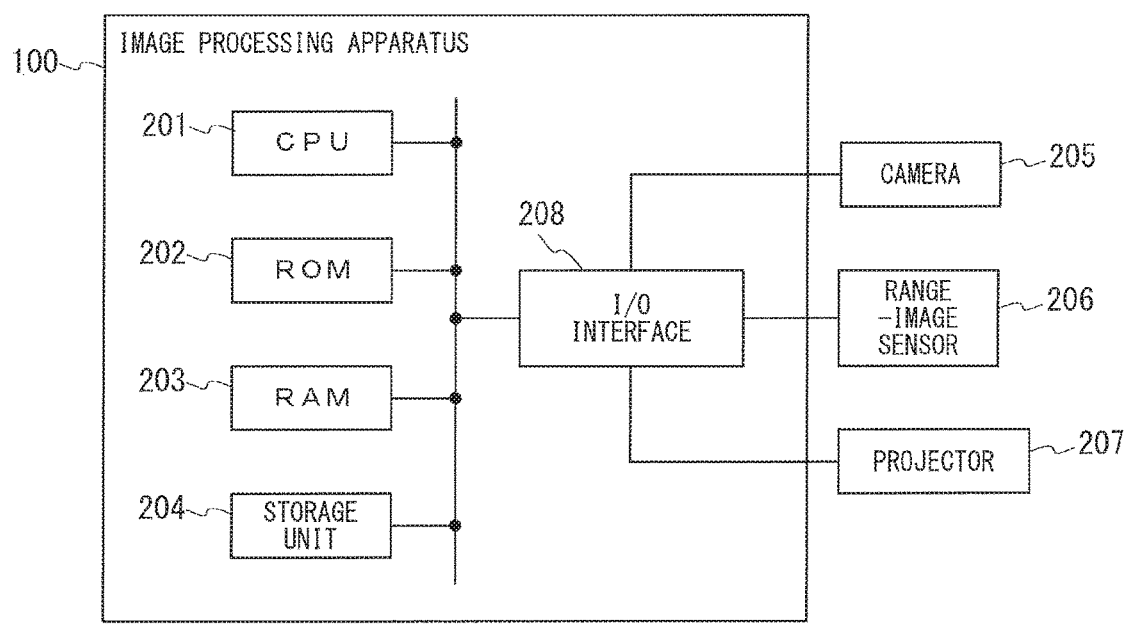
FIG. 2 is a hardware configuration diagram of an image processing apparatus.

FIG. 2 is a hardware configuration diagram of the image processing apparatus 100. The image processing apparatus 100 includes a central processing unit (CPU) 201, a read only memory (ROM) 202, a random access memory (RAM) 203, and a storage unit 204. The image processing apparatus 100 is connected to the camera 205, the range-image sensor 206, and the projector 207 through an I/O interface 208. The CPU 201, the ROM 202, the RAM 203, the storage unit 204, and the I/O interface 208 are connected through a bus so as to be communicable with each other.

The CPU 201 reads a computer program from the ROM 202 and executes the thus read computer program by using the RAM 203 as a working area, thereby controlling an operation of the overall image reading system. By the control performed by the CPU 201, the camera 205 performs imaging, the range-image sensor 206 acquires the range image, and the projector 207 displays the image. The storage unit 204 is a mass-storage device, e.g., a hard disk, and is configured to store the image data acquired by the camera 205.

Figure 3:
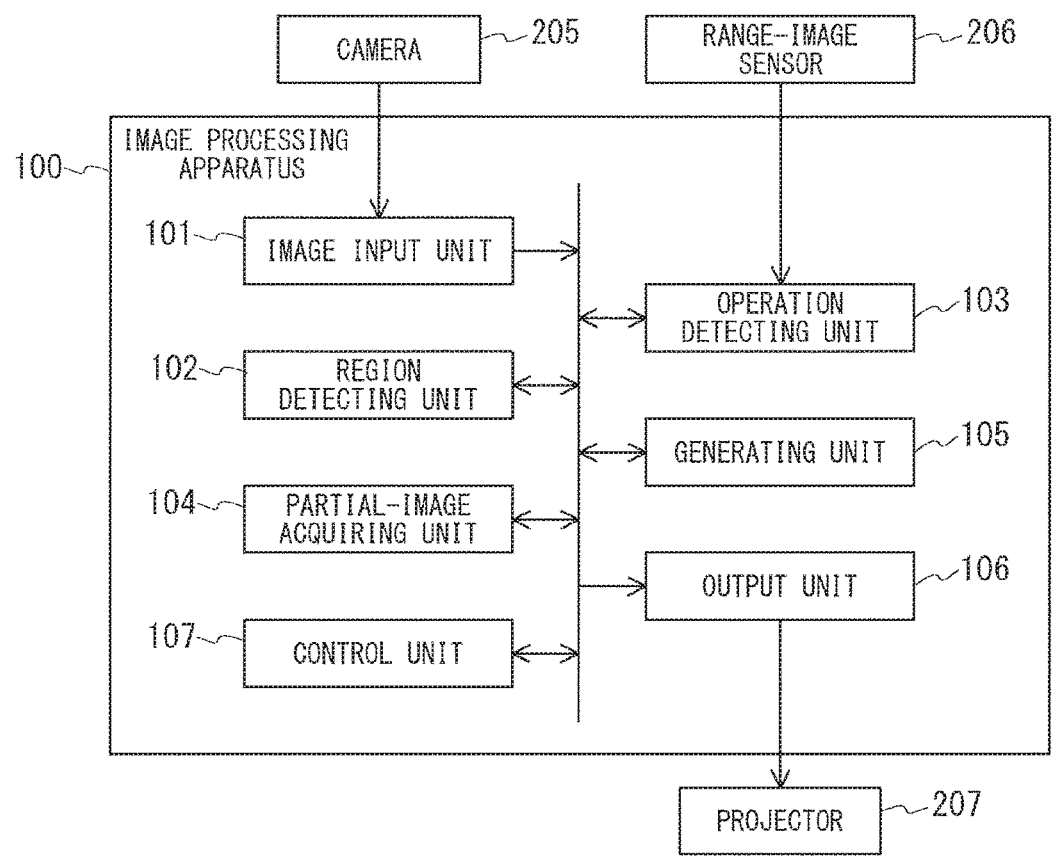
FIG. 3 is a functional block diagram of the image processing apparatus.

FIG. 3 is a functional block diagram of the image processing apparatus 100. Each of the functions of the image processing apparatus 100 is realized by the execution of the computer program by the CPU 201. The image processing apparatus 100 functions as an image input unit 101, a region detecting unit 102, an operation detecting unit 103, a partial-image acquiring unit 104, a generating unit 105, an output unit 106, and a control unit 107.

The image input unit 101 receives the image data input from the camera 205. The region detecting unit 102 detects a region on which the target object placed on the operation plane is imaged as a subject, based on the image data received by the image input unit 101. The operation detecting unit 103 detects an operation of suppressing distortion of the target object. In this embodiment, a user suppresses the distortion of the target object with a hand, a pen, or a special tool for holding down a target object 502 (hereinafter referred to collectively as "operation object"). The operation detecting unit 103 detects movement of the operation object based on the range image acquired from the range-image sensor 206.

The partial-image acquiring unit 104 acquires a partial image of the target object from the image data received by the image input unit 101 in accordance with the operation detected by the operation detecting unit 103. For example, when the hand moves while holding down the target object, the partial-image acquiring unit 104 acquires the image of the target object in a region over which the hand has just passed as a partial image. The generating unit 105 synthesizes a plurality of the partial images acquired by the partial-image acquiring unit 104 to generate a synthetic image of the target object with suppressed distortion. The generating unit 105 stores the generated synthetic image in the storage unit 204 as data obtained by digitalizing the target object. The output unit 106 causes the projector 207 to display, for example, the UI component, the information, and the synthetic image generated by the generating unit 105. The control unit 107 controls each of the functions of the image processing apparatus 100, thereby controlling an operation of the overall image reading system.

(Reading Processing)

Figure 4:
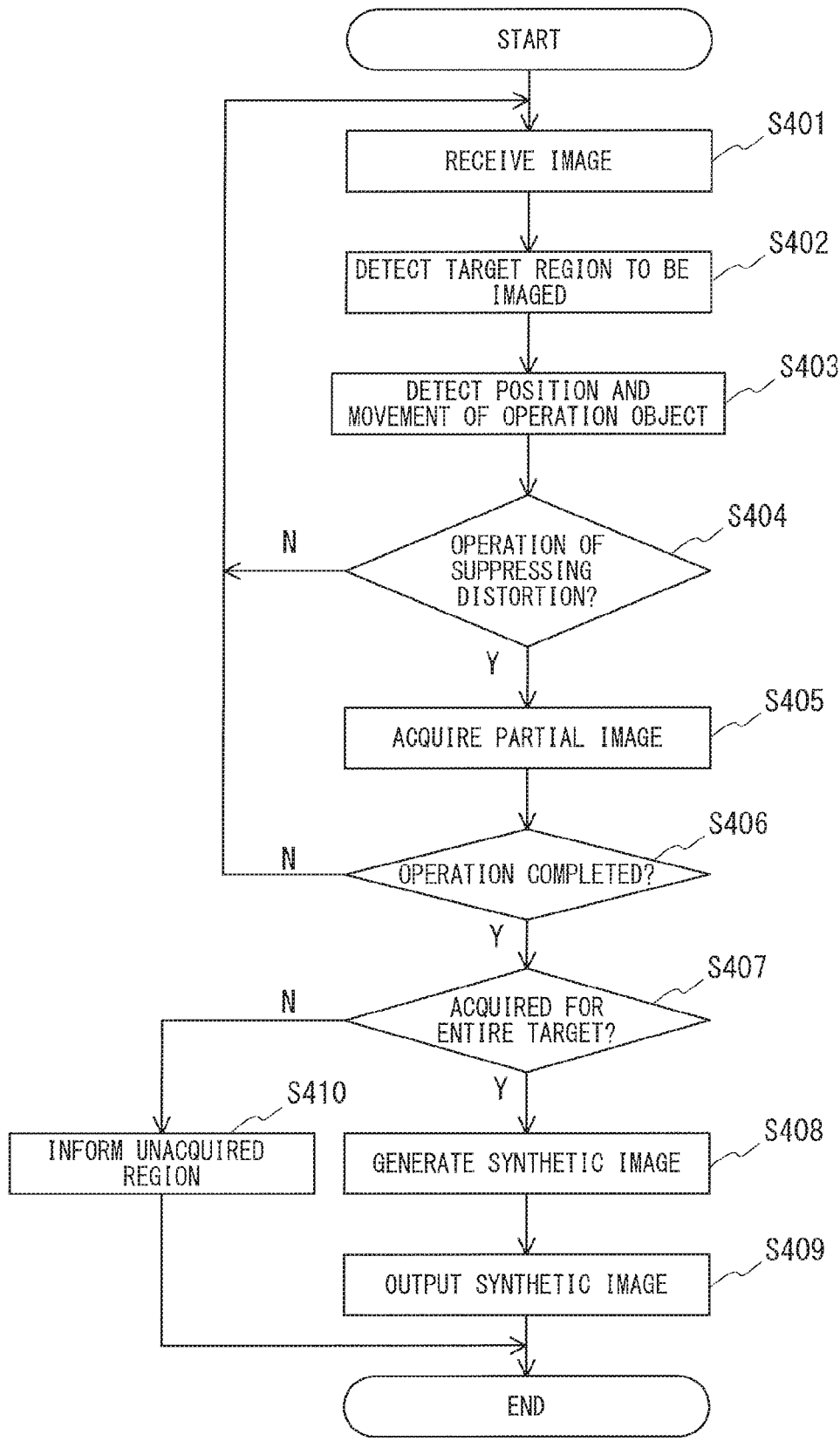
FIG. 4 is a flowchart for illustrating processing of reading an image of a target object.

FIG. 4 is a flowchart for illustrating processing of reading the image of the target object by the image reading system described above. FIG. 5A to FIG. 5G are state explanatory views at the time of reading the image. The user places the target object on the operation plane of the operation table 301, and instructs the image processing apparatus 100 to read the target object. A reading instruction is made by, for example, operating the UI component displayed by the projector 207. The control unit 107 of the image processing apparatus 100 controls the operations of the image processing apparatus 100, the camera 205, the range-image sensor 206, and the projector 207 in accordance with the instruction from the user.

Figure 5A:
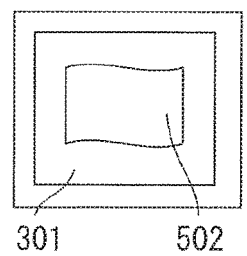
FIGS. 5A to 5G are state explanatory views at the time of reading an image.
Figure 5B:
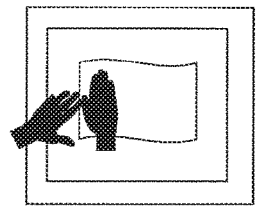

The camera 205 images the operation plane under control of the control unit 107, and transmits image data generated by the imaging to the image processing apparatus 100. The image input unit 101 receives the image data from the camera 205 (Step S401). The image data received by the image input unit 101 includes an image that is directly obtained by imaging with the camera 205 and an image obtained by projective transformation so that the image viewed from a point of view immediately above the operation table 301 is obtained based on camera installation conditions. FIG. 5A is an illustration of an example of the image represented by the image data received by the image input unit 101. The image input unit 101 acquires images in time series at predetermined time intervals. The image contains an image of the operation table 301 and an image of the target object 502, e.g., the document placed on the operation plane.

The region detecting unit 102 detects a target region to be imaged, which contains the target object 502, e.g., the document, from the image data received by the image input unit 101 (Step S402). The region detecting unit 102 is capable of detecting the target region to be imaged through background subtraction or rectangle detection.

The target object 502 is placed on the operation table 301, and has distortion such as a fold or a curl depending on a material and a storage state of the target object 502. The user moves the operation object so as to flatten the target object 502 while holding down the target object 502 as an operation of reducing the distortion of the target object 502. The operation detecting unit 103 detects a position and movement of the operation object as described above (Step S403). FIG. 5B to FIG. 5F are views for illustrating a state in which the user moves a right hand being the operation object from the left to the right in FIG. 5B to FIG. 5F so as to flatten the target object 502 while holding down the target object 502. In this embodiment, the operation detecting unit 103 sets the right hand of the user as the operation object and detects the position and the movement of the right hand of the user. The operation detecting unit 103 determines whether or not the performed operation is an operation of suppressing the distortion of the target object 502 based on the position and the movement of the detected right hand (Step S404). When the operation is not the operation of suppressing the distortion of the target object 502 (Step S404: N), the image processing apparatus 100 repeatedly performs processing after Step S401.

The operation detecting unit 103 detects the operation of suppressing the distortion of the target object 502 based on contact of the right hand with the target region to be imaged or deformation of the target region to be imaged, which is caused by holding down the target object 502 with the right hand. Here, the deformation of the target region to be imaged mainly corresponds to a change in a height direction, for example, in a case where a lifted portion of paper is recessed or flattened so as to be present along an upper surface of the operation table 301 by being held down with the right hand. The operation detecting unit 103 may detect the operation from a single still image or from movement detected from a plurality of images. Alternatively, the operation detecting unit 103 may detect the operation in a state illustrated in FIG. 5F based on movement of the right hand to pass over the target region to be imaged, which is illustrated in FIG. 5B to FIG. 5F. In this case, the images obtained instates illustrated in FIG. 5B to FIG. 5F are required to be buffered so as to acquire partial images described later.

Figure 6A:
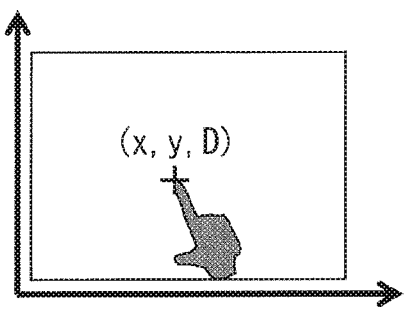
FIG. 6A and FIG. 6B are explanatory views of a range image.
Figure 6B:
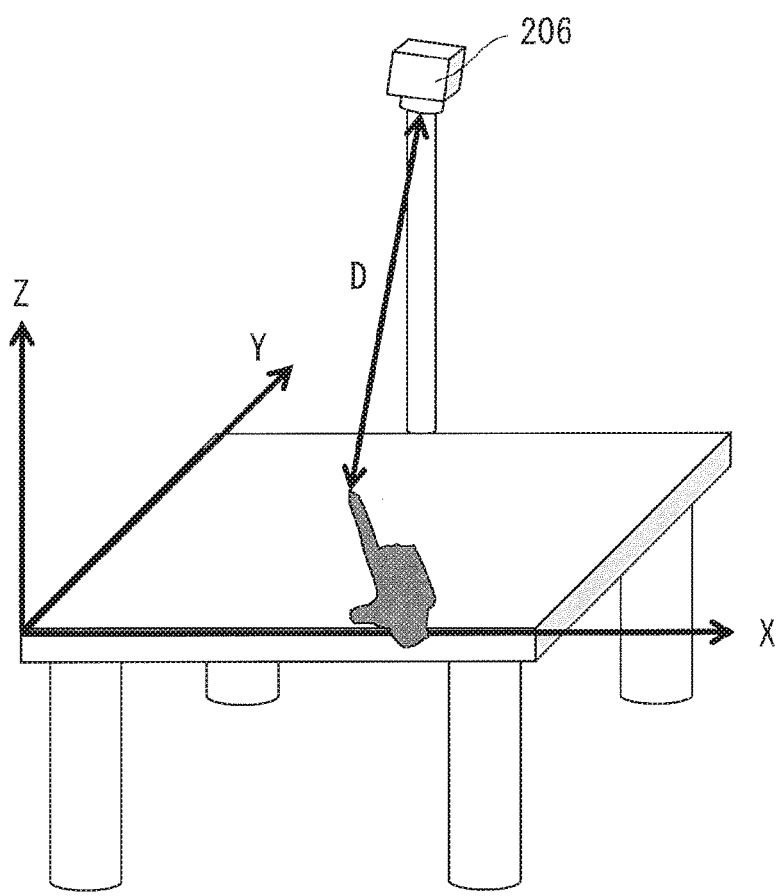

The movement of the operation object may be detected by the operation detecting unit 103 based on the image obtained from the camera 205. In this embodiment, however, the movement of the operation object is detected based on the range image obtained from the range-image sensor 206. FIG. 6A and FIG. 6B are explanatory views of the range image. FIG. 6A is a view for exemplifying the range image. The range image contains a distance D to each of coordinates (x, y) on the image. The operation plane is an XY plane. The range-image sensor 206 measures a distance to each of pixels by a time-of-flight (TOF) method, a pattern irradiation method, or the like. The operation detecting unit 103 detects the operation object based on the range image. As a detection method, a technique such as the background subtraction, pattern matching, or a statistical model can be used. The operation detecting unit 103 transforms a range image system (x, y, D) of coordinates of an end of the hand, each of fingers, and a center of gravity of the hand, which are detected as the operation object, and a distance value thereof into a world coordinate system (X, Y, Z). FIG. 6B is a view for exemplifying the world coordinate system. A transformation formula from the range image system (x, y, D) into the world coordinate system (X, Y, Z) is expressed by the following expression.

$$D \begin{bmatrix} x \\ y \\ 1 \end{bmatrix} = \begin{bmatrix} f_x & 0 & c_x \\ 0 & f_y & c_y \\ 0 & 0 & 1 \end{bmatrix} \begin{bmatrix} r_{00} & r_{01} & r_{02} & t_0 \\ r_{10} & r_{11} & r_{12} & t_1 \\ r_{20} & r_{21} & r_{22} & t_2 \end{bmatrix} \begin{bmatrix} X \\ Y \\ Z \\ 1 \end{bmatrix}$$

In the expression, $r_{00}$ to $r_{22}$, $t_0$ to $t_2$, $f_x$, $f_y$, $c_x$, and $c_y$ are parameters that are obtained in advance by calibration at the time of installation of the range-image sensor 206. Each of the parameters is calculated in advance by a least-square method or the like when the number of known points for which a correspondence relationship between the world coordinates (X, Y, Z) and the image coordinates (x, y) has been obtained is equal to or larger than the number of parameters.

The operation detecting unit 103 transforms a position of the operation object into the world coordinate system (X, Y, Z). Based on the transformed coordinates, whether or not the operation object is in contact with the target region to be imaged is determined. Here, the operation detecting unit 103 obtains the correspondence relationship between the position on the image and the position on the world coordinates even for the image acquired by the camera 205. The operation detecting unit 103 determines whether or not the operation is the operation of suppressing the distortion of the target object based on whether or not a Z coordinate of the operation object is close to a Z coordinate of the target region to be imaged and the coordinates of the operation object fall within a range of the XY coordinate system of the target region to be imaged. Further, in a case where the operation object is the hand, the operation detecting unit 103 may determine that the performed operation is the operation of suppressing the distortion of the target object only when the hand is open.

Figure 5C:
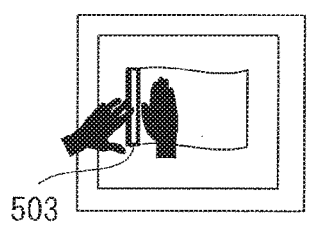
Figure 5D:
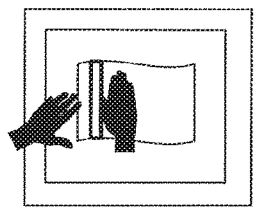
Figure 5E:
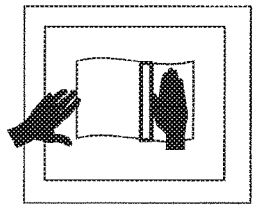

When the operation is the operation of suppressing the distortion of the target object 502 (Step S404: Y), the partial-image acquiring unit 104 acquires a partial image of the target region to be imaged in accordance with the position of the right hand that performs the operation (Step S405). In FIG. 5C, the partial-image acquiring unit 104 acquires a partial image 503 corresponding to an image of a portion of the target object 502. The partial-image acquiring unit 104 acquires a range determined by a range over which the right hand has just passed and the target region to be imaged as the partial image 503 based on the position of the operation object, which is detected by the operation detecting unit 103, and the target region to be imaged, which is detected by the region detecting unit 102. Alternatively, the range of the partial image 503 may also be set based on, for example, a region of the operation object.

When the user holds down the target object 502 with the left hand so as to fix the target object 502 and moves the right hand so as to flatten the target object 502 while holding down the target object 502 with the right hand, the region over which the right hand has just passed is a region in which the target object 502 has reduced distortion. The region having a height lowered or kept low after the passage of the right hand thereover can also be detected by a measurement as the region with the smaller distortion. The partial-image acquiring unit 104 acquires the range that is held down with the right hand and flattened by the movement of the right hand as the partial image 503. In states illustrated in FIG. 5D to FIG. 5F, the partial-image acquiring unit 104 similarly acquires the partial images. In the state illustrated in FIG. 5C, the left hand that holds down the target object 502 is sometimes contained in the partial image 503. In this case, a hand region may be erased from the target region to be imaged on the image based on the hand region detected by the operation detecting unit 103.

Figure 5F:
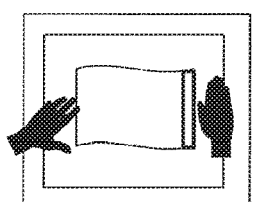

The operation detecting unit 103 determines whether or not the operation of suppressing the distortion of the target object 502 has been completed (Step S406). The operation detecting unit 103 detects the completion of the operation of suppressing the distortion of the target object 502 based on, for example, the movement of the right hand of the user out of the target region to be imaged, as illustrated in FIG. 5F. Alternatively, the operation detecting unit 103 may detect the completion of the operation of suppressing the distortion based on an operation of the UI button performed by the user. When the operation has not been completed (Step S406: N), the image processing apparatus 100 repeatedly performs the processing after Step S401. By repeatedly performing the processing after Step S401, the image processing apparatus 100 sequentially acquires the partial images illustrated in FIG. 5C to FIG. 5F.

When the operation has been completed (Step S406: Y), the partial-image acquiring unit 104 confirms whether or not the partial images have been acquired so as to cover the entire target region to be imaged (Step S407).

Figure 5G:
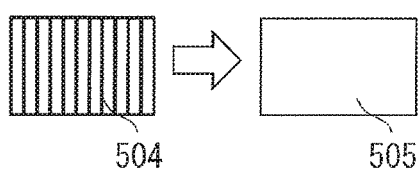

When the partial images have been acquired so as to cover the entire target region to be imaged (Step S407: Y), the generating unit 105 synthesizes the partial images acquired by the partial-image acquiring unit 104 to generate a synthetic image (Step S408). FIG. 5G is an explanatory view of the synthetic images. The generating unit 105 generates a synthetic image 505 of the target object 502 from partial-image rows 504 including the partial images acquired by the partial-image acquiring unit 104 in time series during the operation of suppressing the distortion of the target object 502. The synthetic image 505 is generated by overlapping the partial images 503 based on the positions of the partial images in the image or synthesis based on feature points common to the partial images. When the partial images are synthetized based on the feature points, for example, the generating unit 105 detects key points appearing in each of the partial images in a characteristic fashion and associates the feature points of the partial images by a RANSAC algorithm based on an SIFT feature amount so as to synthesize the partial images. A synthesizing method is not limited thereto.

The output unit 106 outputs the synthetic image 505 of the target object 502, which is generated by the generating unit 105, to the projector 207 so that the projector 207 displays the synthetic image 505 (Step S409). The image processing apparatus 100 may perform analysis processing such as character recognition using the synthetic image 505 as an input. As described above, the image processing apparatus 100 acquires the partial images, each being obtained immediately after the passage of the operation object such as the right hand over a corresponding portion of the target object 502 while the target object 502 is held down with the right hand so as to be flattened, and synthetizes the partial images. As a result, the image of the target object with reduced distortion can be acquired.

Figure 7A:
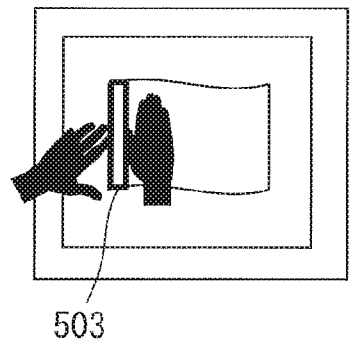
FIGS. 7A to 7D are explanatory views of an unacquired region.
Figure 7B:
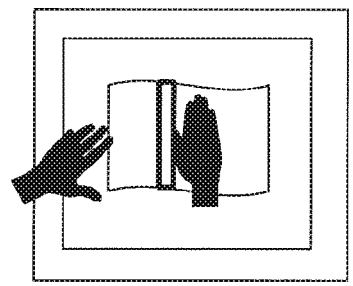
Figure 7C:
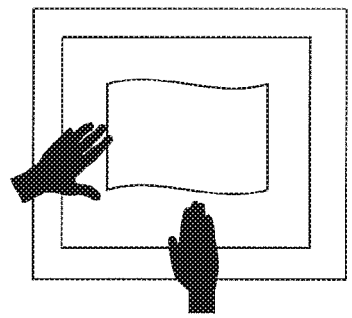
Figure 7D:
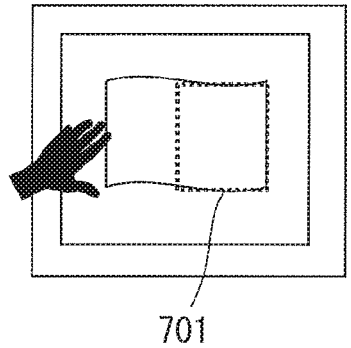

When the partial image has not been acquired at least for a portion of the target region to be imaged (Step S407: N), the output unit 106 informs the user of the presence of a region for which the partial image has not been acquired (hereinafter referred to as "unacquired region") (Step S410). FIG. 7A to FIG. 7D are explanatory views of the unacquired region. In FIG. 7A and FIG. 7B, the operation of suppressing the distortion of the target object is performed so that the partial-image acquiring unit 104 acquires the partial images of portions that have been subjected to the operation. When the user interrupts the operation of suppressing the distortion of the target object and separates the right hand from the target object as illustrated in FIG. 7C, the partial-image acquiring unit 104 determines that there is a partial image that has not been acquired in the target region to be imaged. The output unit 106 informs the user of the presence of an unacquired region 701 by using an image for showing the unacquired region 701 in the target region to be imaged, as illustrated in FIG. 7D. In this embodiment, the projector 207 is used as a display device. Therefore, the unacquired region 701 can be displayed so as to overlap the target object.

Figure 8A:
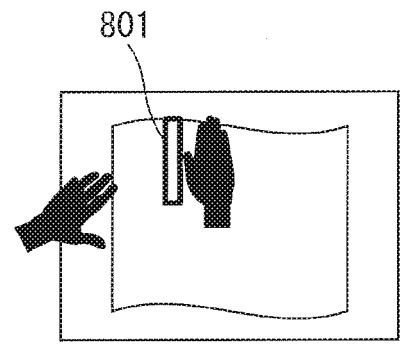
FIG. 8A, FIG. 8B, and FIG. 8C are other explanatory views of the unacquired region.
Figure 8B:
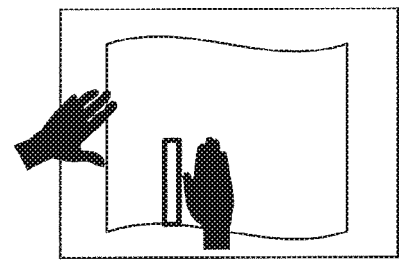
Figure 8C:
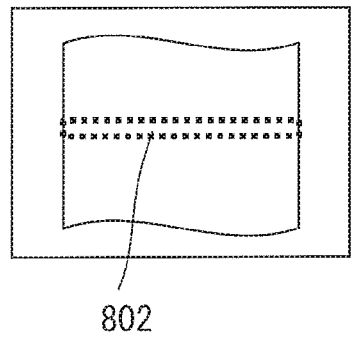

FIG. 8A to FIG. 8C are other explanatory views of the unacquired region. In FIG. 8A to FIG. 8C, the user performs the operation of suppressing the distortion in two steps respectively in a direction perpendicular to the direction in which the user moves the right hand over the target object. In contrast to FIG. 5A to FIG. 5G and FIG. 7A to FIG. 7D, the partial-image acquiring unit 104 acquires an image of a region in accordance with a size of the right hand (operation object) as a partial image 801 from the target region to be imaged, in FIG. 8A. The size of the right hand is detected by the operation detecting unit 103 based on model matching of the right hand or detection of a wrist at which a size becomes minimum. When the partial images are acquired as illustrated in FIG. 8A and FIG. 8B, the target object is flattened by the movement of the right hand while being held down with the right hand for a plurality of times. Therefore, a gap is sometimes generated between the partial images acquired by the operation performed for the plurality of times. FIG. 8C is a view for exemplifying a gap 802 between the partial images that are acquired by the operation performed twice. Similarly to FIG. 7D, the output unit 106 outputs an image for showing the gap 802 to the projector 207 so that the projector 207 displays the image on the target object in an overlapping manner, thereby informing the user of the presence of the unacquired region.

The user flattens the region for which the notification is made by moving the right hand while holding down the unacquired region with the right hand, thereby enabling the partial-image acquiring unit 104 to acquire the partial image of the unacquired region. In this manner, the generating unit 105 can generate the synthetic image that covers the entire target object. When the partial images, which are acquired separately for the plurality of times, overlap each other at the time of synthesis, the generating unit 105 uses the partial image acquired later to generate the synthetic image. Alternatively, supposing that the partial region that is closer to the center of gravity of the right hand that performs the operation (operation object) has smaller distortion, the generating unit 105 generates the synthetic image.

As described above, the image processing apparatus 100 detects the operation of holding down and flattening the target object as the operation of suppressing the distortion of the target object and sequentially acquires the partial images of the portions over which the right hand has just passed so as to generate the synthetic image of the target object. As a result, the image of the target, which has the reduced distortion, can be obtained. Further, when the partial images have not been obtained for the entire target region to be imaged, the image processing apparatus 100 notifies the user of the presence of the unacquired region so as to urge the user to perform the operation of suppressing the distortion. As a result, the image of the target object, in which the distortion is entirely suppressed, can be obtained.

FIG. 9A to FIG. 9D are still further state explanatory views at the time of reading the image. FIG. 5A to FIG. 5G are the views for illustrating the operation of fixing the target object with one hand while moving another hand in one direction so as to flatten the target object, whereas FIG. 9A to FIG. 9D are views for illustrating an operation of flattening the target object with both hands that are moved in different directions. Processing itself of the image acquisition system is the same as that performed when one hand is moved to flatten the target object except for the acquisition of the partial images in accordance with the movement of both hands.

Figure 9A:
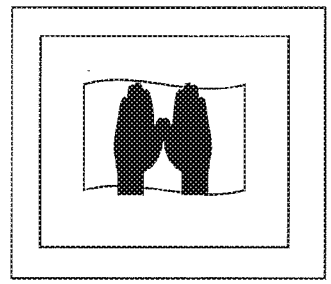
FIGS. 9A to 9D are other state explanatory views at the time of reading the image.
Figure 9B:
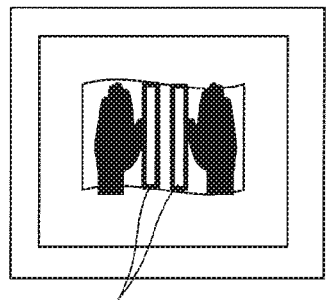
Figure 9C:
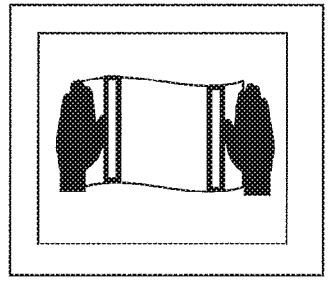

In FIG. 9A, the user holds down the vicinity of the center of the target object with both hands. The operation detecting unit 103 detects the state illustrated in FIG. 9A as the operation of suppressing the distortion of the target object (Step S404). When the user moves both hands respectively in different directions while holding down the target object as illustrated in FIG. 9B to FIG. 9D, the partial-image acquiring unit 104 sequentially acquires images of the regions over which the hands have just passed as the partial images 503 (Step S405).

Figure 9D:
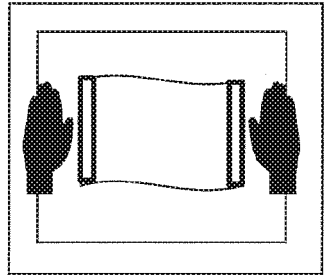

When detecting that both hands move out of the target region to be imaged while maintaining a height in a Z-coordinate direction, which is equal to that of the target object, as illustrated in FIG. 9D, the operation detecting unit 103 determines the completion of the operation (Step S406: Y). In this manner, the generating unit 105 synthesizes the acquired partial images to generate the synthetic image (Step S408).

The operation detecting unit 103 detects whether the operation is performed with one hand or both hands in the processing performed in Step S404 based on the number of hands placed on the target object, specifically, whether one hand is placed on the target object or both hands are placed on the target object. While the operation detected in this step is continued, the partial-image acquiring unit 104 acquires the partial images.

FIG. 10A to FIG. 10D are still further state explanatory views at the time of reading the image. In FIG. 10A to FIG. 10D, the partial image is acquired in accordance with the region of the target object, which is held down by the user with the hands or a special tool.

Figure 10A:
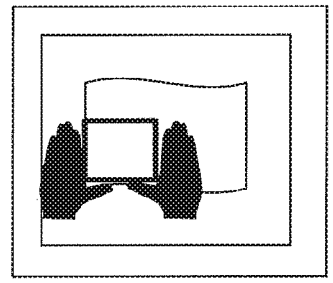
FIGS. 10A to 10D are other state explanatory views at the time of reading the image.
Figure 10B:
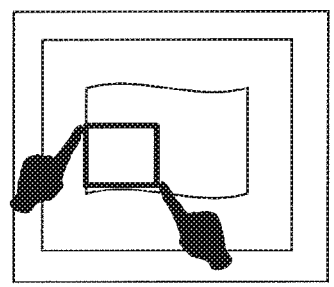

In FIG. 10A, the user forms a rectangle for the partial image with the hands and holds down the target object so as to suppress the distortion. In FIG. 10B, the user points out corners of the rectangle for the partial image with fingers and holds down the target object so as to suppress the distortion. In FIG. 10A and FIG. 10B, the partial-image acquiring unit 104 does not acquire the partial images continuously in time series in accordance with the movement of the hands. Instead, the partial image is acquired each time the operation detecting unit 103 detects the operation illustrated in FIG. 10A or the operation illustrated in FIG. 10B.

Figure 10C:
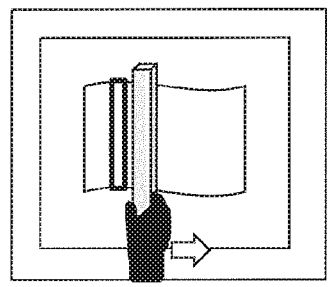
Figure 10D:
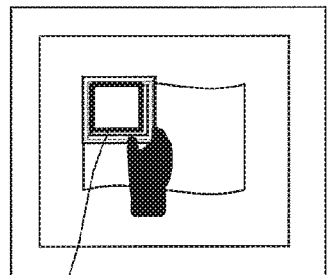

FIG. 10C is a view for illustrating an example where a bar-like operation object is used. The partial-image acquiring unit 104 sequentially acquires the images of portions of the target region to be imaged, over which the bar-like operation object has just passed, as the partial image. FIG. 10D is a view for illustrating an example where a rectangular window frame-like operation object is used. The partial-image acquiring unit 104 acquires the image of a portion of the target region to be imaged, which is visible through an opening 1001 of the operation object, as the partial image.

As described above, as long as the operation of suppressing the distortion of the target object can be detected to acquire the partial images so as to enable the generation of the synthetic image, any way of holding down the target object and any tool for holding down the target object may be used.

Further, the image processing apparatus 100 may generate an image of at least a portion of the target object as the partial image. In this case, the processing performed in Step S407 and the processing performed in Step S410 illustrated in FIG. 4 are not required. FIG. 11A to FIG. 11E are state explanatory views at the time of reading the image in such a case.

Figure 11A:
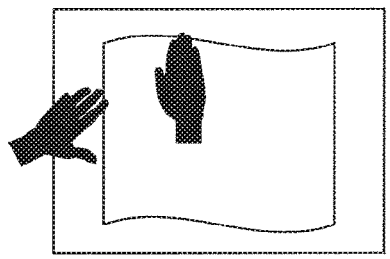
FIGS. 11A to 11E are other state explanatory views at the time of reading the image.
Figure 11B:
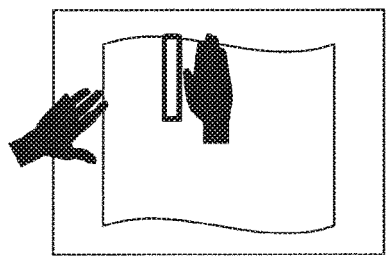
Figure 11C:
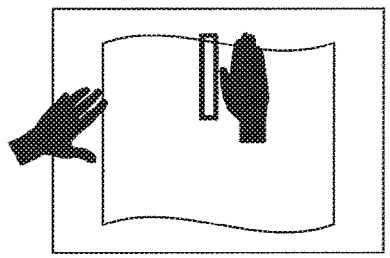
Figure 11D:
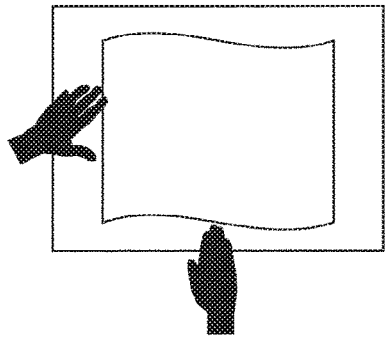
Figure 11E:
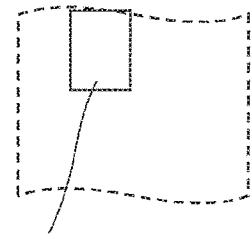

As illustrated in FIG. 11A, when the user holds down a portion of the target object with the right hand, the operation detecting unit 103 detects the operation of suppressing the distortion of the target object (Step S404). As illustrated in FIG. 11B and FIG. 11C, the user moves the right hand so as to flatten the portion of the target object while holding down the target object with the right hand. As a result, the partial-image acquiring unit 104 acquires the partial image of the region over which the right hand has just passed (Step S405). When the user separates the right hand that has held down the target object from the target object as illustrated in FIG. 11D, the operation detecting unit 103 determines the completion of the operation of suppressing the distortion of the target object 502 (Step S406: Y). The generating unit 105 synthesizes the partial images acquired by the partial-image acquiring unit 104 to generate the image of the portion of the target object. FIG. 11E is an explanatory view of the image of the portion of the target object, which is generated by the generating unit 105. The broken line indicates the entire region of the target object. The solid line 1101 indicates the image of a portion of the target object, which has been held down and flattened with the right hand. Through the processing described above, the user can digitalize the image of a desired portion of the target object by performing an intuitive operation of holding down and flattening the desired portion of the target object, which is similar to an operation of a handy scanner.

Figure 12:
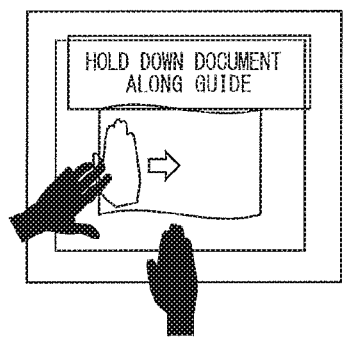
FIG. 12 is an explanatory view of display of a guide.

The image reading system may guide the position at which the operation object, e.g., the hand, holds down the target object and a direction of moving the hand so as to flatten the target object in accordance with display of the projector 207. FIG. 12 is an explanatory view of guide display. The output unit 106 of the image processing apparatus 100 displays a guide on the target object by means of the projector 207. When the user holds down the target object with the hands in accordance with the guide, the operation detecting unit 103 detects the operation of holding down the target object. The image processing apparatus 100 guides the direction of moving the right hand to flatten the target object. The user moves the right hand so as to flatten the target object in accordance with the guide while holding down the target object. As a result, the image processing apparatus 100 can sequentially acquire the partial images so as to acquire the synthetic image of the target object.

The display of the guide enables the image processing apparatus 100 to suppose the position on which the user places the hand. The operation detecting unit 103 determines the operation of suppressing the distortion of the target object in the processing performed in Step S404 based on a relationship between the position of the hand and a position at which the guide is displayed. For example, the operation detecting unit 103 can determine the operation of suppressing the distortion of the target object based on whether or not the position of the hand and the position at which the guide is displayed coincide with each other on the image or on the operation plane.

[Second Embodiment]

The image processing apparatus 100 first acquires the entire image of the target object and subsequently acquires a partial image of a portion with large distortion so that the partial image is synthesized with the entire image. In this manner, the image of the target object without distortion can be acquired. The image processing apparatus 100 according to a second embodiment of the present invention is different from the image processing apparatus 100 according to the first embodiment in functional blocks. However, the remaining configuration of the image processing apparatus 100 according to the second embodiment is the same as that of the first embodiment. The description for the same configuration is omitted here.

Figure 13:
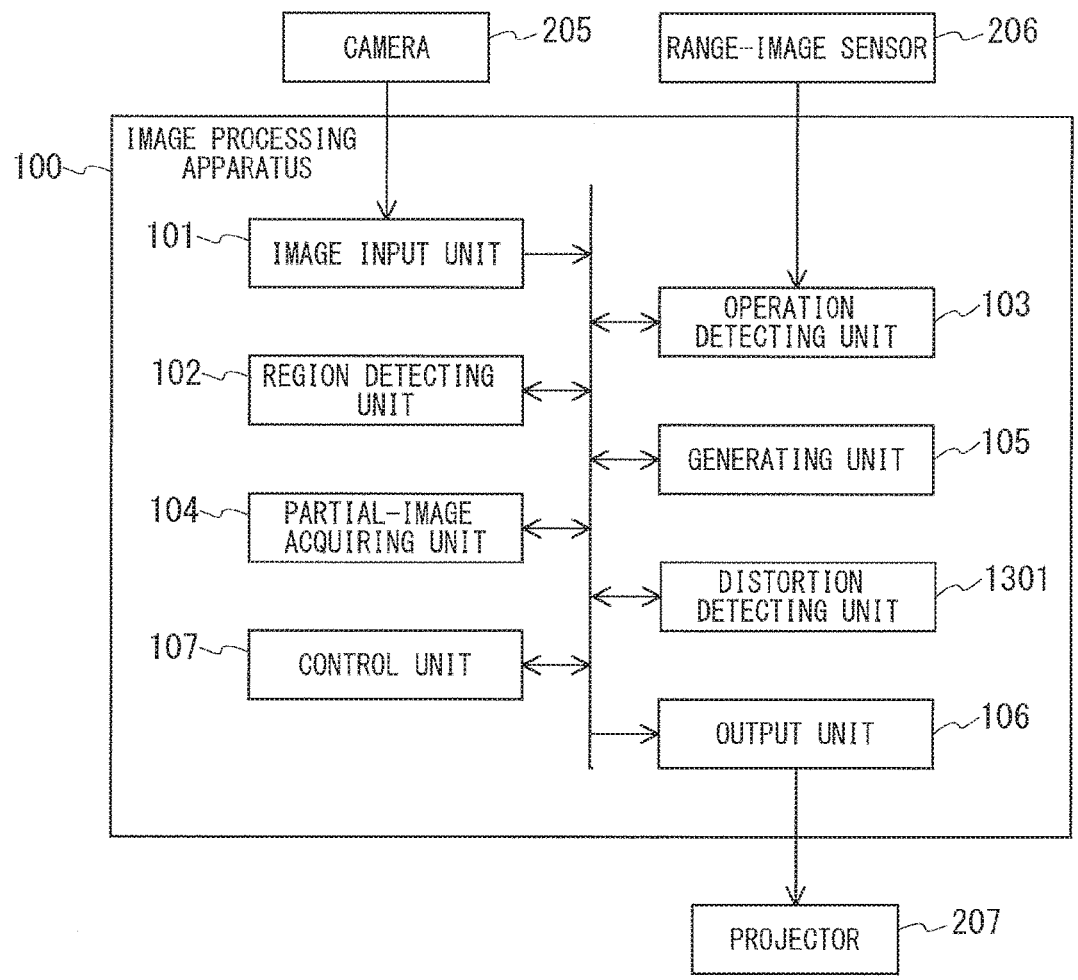
FIG. 13 is a functional block diagram of the image processing apparatus.

FIG. 13 is a functional block diagram of the image processing apparatus 100 according to the second embodiment. The image processing apparatus 100 is configured to further include a distortion detecting unit 1301 in addition to the functional blocks of the image processing apparatus 100 of FIG. 3 according to the first embodiment. The distortion detecting unit 1301 is configured to detect a distorted region in which the distortion is caused, from the entire image of the target object. The distortion detecting unit 1301 is configured to detect the distorted region based on, for example, distortion of a line, e.g., a profile of the target object contained in the target region to be imaged, or distortion of a line or distortion of a character on a written document when the target object contains the written document. The distortion detecting unit 1301 may detect the distorted region from the range image acquired by the range-image sensor 206 based on flatness of the target object in the height direction.

Figure 14:
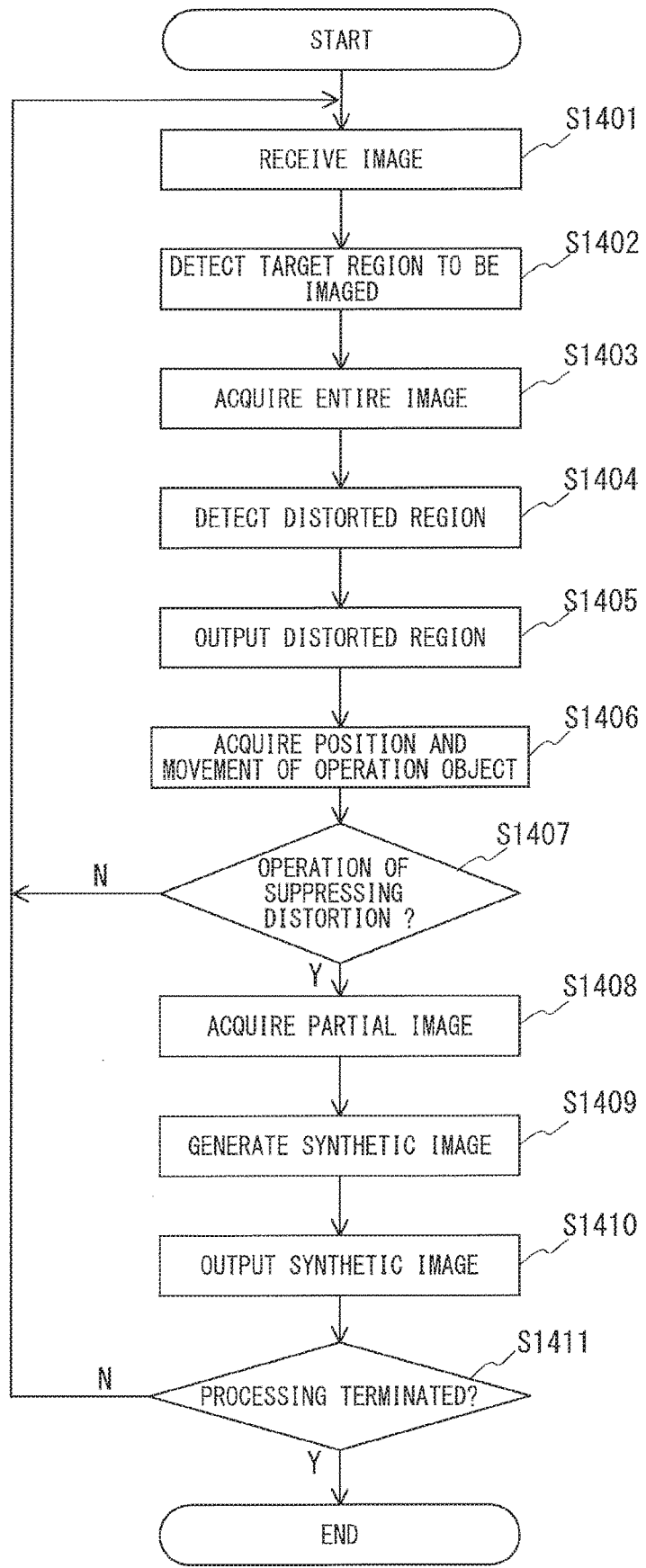
FIG. 14 is a flowchart for illustrating processing of reading the image of the target object.

FIG. 14 is a flowchart for illustrating processing of reading the image of the target object by the image reading system described above. FIG. 15A to FIG. 15I are state explanatory views at the time of reading the image. Processing performed in Step S1401 and processing performed in Step S1402 of FIG. 14 are respectively the same as that performed in Step S401 and that performed in Step S402 of FIG. 4.

Figure 15A:
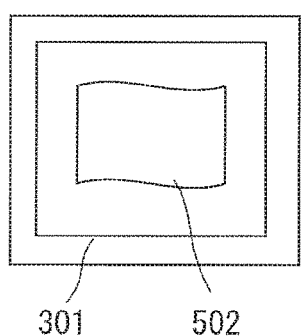
FIGS. 15A to 15I are state explanatory views at the time of reading the image.
Figure 15B:

The image processing apparatus 100 that has detected the target region to be imaged in the processing performed in Step S1402 acquires the entire image of the target region to be imaged, which is the entire image of the target object, by the region detecting unit 102 (Step S1403). FIG. 15A is an example of an image represented by the image data received by the image input unit 101. The image contains the image of the operation table 301 and the image of the target object 502, e.g., the document placed on the operation plane. FIG. 15B is a view for illustrating the entire image of the target region to be imaged. The region detecting unit 102 acquires the entire image illustrated in FIG. 15B.

Figure 15C:
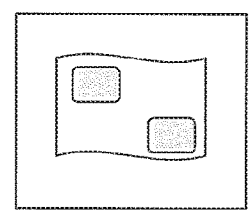

The distortion detecting unit 1301 detects the distorted region from the entire image of the imaged region (Step S1404). The output unit 106 outputs the distorted region detected by the distortion detecting unit 1301 (Step S1405) to cause the projector 207 to project the image for showing the distorted region onto the target object. FIG. 15C is a view for illustrating a state in which the image of the distorted region is projected on the target object. In FIG. 15C, an upper left portion and a lower right portion, each being surrounded by a frame, are the distorted regions. When the operation table 301 is a display, the output unit 106 may display the image of the distorted region in the vicinity of the distorted region outside of the target object. Alternatively, the output unit 106 may display the image of the target region to be imaged and the image of the distorted region in an overlapping manner at a position different from the position at which the target object is placed.

Figure 15D:
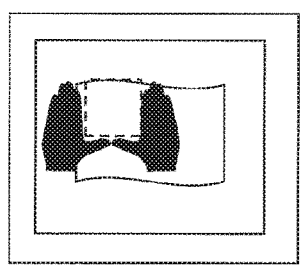
Figure 15E:
Figure 15F:
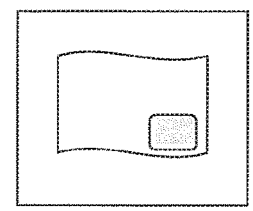

Processing performed in Steps S1406 to S1408 is the same as that performed in Steps S403 to S405 of FIG. 4. At this time, the user holds down the target object so as to surround the distorted region with the hands, as illustrated in FIG. 15D. The partial-image acquiring unit 104 acquires the region surrounded by the broken line in FIG. 15D as the partial image. The generating unit 105 synthesizes the partial image acquired by the partial-image acquiring unit 104 and the entire image of the target region to be imaged to generate the synthetic image (Step S1409). FIG. 15E is an explanatory view of the synthetic image. A region surrounded by the broken line is the partial image that is overlapped with the entire image. The output unit 106 outputs the synthetic image generated by the generating unit 105 (Step S1401). As a result, the distortion in the upper left distorted region (see FIG. 15C) is suppressed.

Figure 15G:
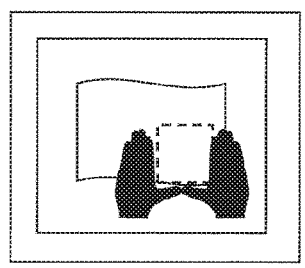
Figure 15H:
Figure 15I:
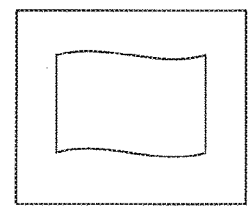

The distortion in the lower right distorted region is not suppressed yet. Therefore, the image processing apparatus 100 repeatedly performs the processing after Step S1401 (Step S1411: N). The distortion detecting unit 1301 detects the distorted region illustrated in FIG. 15F. The user holds down the target object so as to surround the distorted region with the hands, as illustrated in FIG. 15G. In this manner, the image processing apparatus 100 generates the synthetic image as illustrated in FIG. 15H. FIG. 15I is an exemplary view of the output synthetic image. Image data of the synthetic image is stored in the storage unit 204 as data obtained by digitalizing the target object. In the manner described above, the processing of digitalizing the target object is terminated (Step S1411: Y).

As described above, the image processing apparatus 100 detects and displays the distorted region on the entire image of the target to be imaged, detects the operation in which the user holds down the target object, and sequentially synthesizes the partial image with the entire image. As a result, the image with reduced distortion can be acquired.

In the first embodiment and the second embodiment, the range-image sensor 206 is configured to image the range image of the operation table 301 having the horizontally arranged operation plane from above so as to detect the operation performed by the user. When the operation plane is provided vertically in a case where the operation table 301 is mounted on a wall or the like, the range-image sensor 206 images the range image in the horizontal direction. In this case, the target to be imaged is fixed on the operation plane by using a magnet or the like. The magnet is desired to be provided at a position at which the distortion of the target object is efficiently suppressed. The target object may also be an object whose shape changes to cause the distortion, such as a textile for clothing and a plastic material, in addition to the paper document or the book.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAN), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-154205, filed Aug. 4, 2015 which is hereby incorporated by reference herein in its entirety.

What is claimed is:

1. An apparatus, comprising:
at least one processor; and
a memory having stored thereon instructions which, when executed by the at least one processor, cause the apparatus to:
receive input of an image on which a target object placed on an operation plane is imaged as a subject;
detect movement of a predetermined operation object in a state of being in contact with the target object using the image;
acquire a partial image corresponding to a portion of the target object from the image in accordance with a position of the predetermined operation object being moved in a case where the movement of the predetermined operation object is detected;
generate an image representing the target object using a plurality of the acquired partial images;
cause a predetermined display device to display the generated image on the operation plane; and
inform, in a case where the apparatus has not acquired the partial image of at least the portion of the target object placed on the operation plane when the movement of the predetermined operation object is completed, presence of an unacquired region through the display device.

2. The apparatus according to claim 1, wherein the execution of the instructions by the at least one processor further causes the apparatus to sequentially acquire the plurality of the partial images in accordance with a range of the target object, over which the predetermined operation object has passed.

3. The apparatus according to claim 1, wherein the execution of the instructions by the at least one processor further causes the apparatus to acquire a partial image containing at least a portion of the target object, over which the predetermined operation object has just passed, from each of a plurality of images acquired in time series, which are input.

4. The apparatus according to claim 1, wherein the execution of the instructions by the at least one processor further causes the apparatus to:
detect a region in which the target object placed on the operation plane is imaged as a subject from the received image; and
acquire a range determined by a position of the predetermined operation object and the detected region as the partial image.

5. The apparatus according to claim 1, wherein the execution of the instructions by the at least one processor further causes the apparatus to acquire a range image containing the target object and the predetermined operation object so as to detect the movement of the predetermined operation object in accordance with the acquired range image.

6. The apparatus according to claim 5, wherein the execution of the instructions by the at least one processor further causes the apparatus to:
detect an operation in which the predetermined operation object surrounds a predetermined range of the target object; and
acquire an image of the predetermined range of the target object, which is surrounded by the predetermined operation object, as the partial image.

7. The apparatus according to claim 1, wherein the execution of the instructions by the at least one processor further causes the apparatus to:
detect an operation in which the predetermined operation object holds down the target object; and
acquire the partial image in accordance with a position at which the predetermined operation object holds down the target object.

8. The apparatus according to claim 7, wherein the execution of the instructions by the at least one processor further causes the apparatus to:
detect an operation in which the predetermined operation object flattens the target object while holding down the target object; and
acquire an image of a range flattened while being held down by the predetermined operation object as the partial image.

9. The apparatus according to claim 1, wherein the execution of the instructions by the at least one processor further causes the apparatus to synthesize a plurality of the partial images to generate a synthetic image representing at least a portion of the target object.

10. The apparatus according to claim 1, wherein the execution of the instructions by the at least one processor further causes the apparatus to synthesize the received image and the acquired partial image to generate a synthetic image representing the target object.

11. The apparatus according to claim 1, wherein the execution of the instructions by the at least one processor further causes the apparatus to display the generated image so as to overlap the target object.

12. The apparatus according to claim 1, wherein the execution of the instructions by the at least one processor further causes the apparatus to cause the display device to display a guide indicating a position to be operated by the predetermined operation object.

13. The apparatus according to claim 1, the execution of the instructions by the at least one processor further causes the apparatus to:
detect a distorted region of the target object from the received image; and
cause the display device to display an image representing the distorted region.

14. The apparatus according to claim 1, wherein the target object is the object whose shape changes, and the change causes distortion of the target object.

15. An image reading method to be executed by a system, the system comprising an imaging apparatus configured to image an image on which a target object placed on an operation plane is imaged as a subject, a movement detecting apparatus configured to detect movement of a predetermined operation object on the operation plane, and an apparatus, the image reading method comprising:

receiving, by the apparatus, the image imaged by the imaging apparatus;

acquiring, by the apparatus, a partial image corresponding to a portion of the target object from the image imaged by the imaging apparatus in accordance with a position of the predetermined operation object being moved in a case where the movement of the predetermined operation object is detected by the movement detecting apparatus;

generating, by the apparatus, an image representing the target object using a plurality of the acquired partial images;

causing a predetermined display device to display the generated image on the operation plane; and informing, in a case where the apparatus has not acquired the partial image of at least the portion of the target object placed on the operation plane when the movement of the predetermined operation object is completed, presence of an unacquired region through the display device.

16. A non-transitory computer-readable storage medium having stored thereon a computer program for controlling a computer, which is connected to an imaging apparatus configured to image an image on which a target object to be placed on an operation plane is imaged as a subject and a movement detecting apparatus configured to detect movement of a predetermined operation object on the operation plane, to function as:

an image input unit configured to receive the image imaged by the imaging apparatus;

a partial-image acquiring unit configured to acquire a partial image corresponding to a portion of the target object from the image imaged by the imaging apparatus in accordance with a position of the predetermined operation object being moved in a case where the operation detecting unit detects the movement of the predetermined operation object;

a generating unit configured to generate an image representing the target object using a plurality of the partial images acquired by the partial-image acquiring unit; and an output unit configured to cause a predetermined display device to display the image generated by the generating unit on the operation plane, wherein the output unit is further configured to inform, in a case where the partial-image acquiring unit has not acquired the partial image of at least the portion of the target object placed on the operation plane when the movement of the predetermined operation object is completed, presence of an unacquired region through the display device.

* * * * *